Patented June 4, 1929.

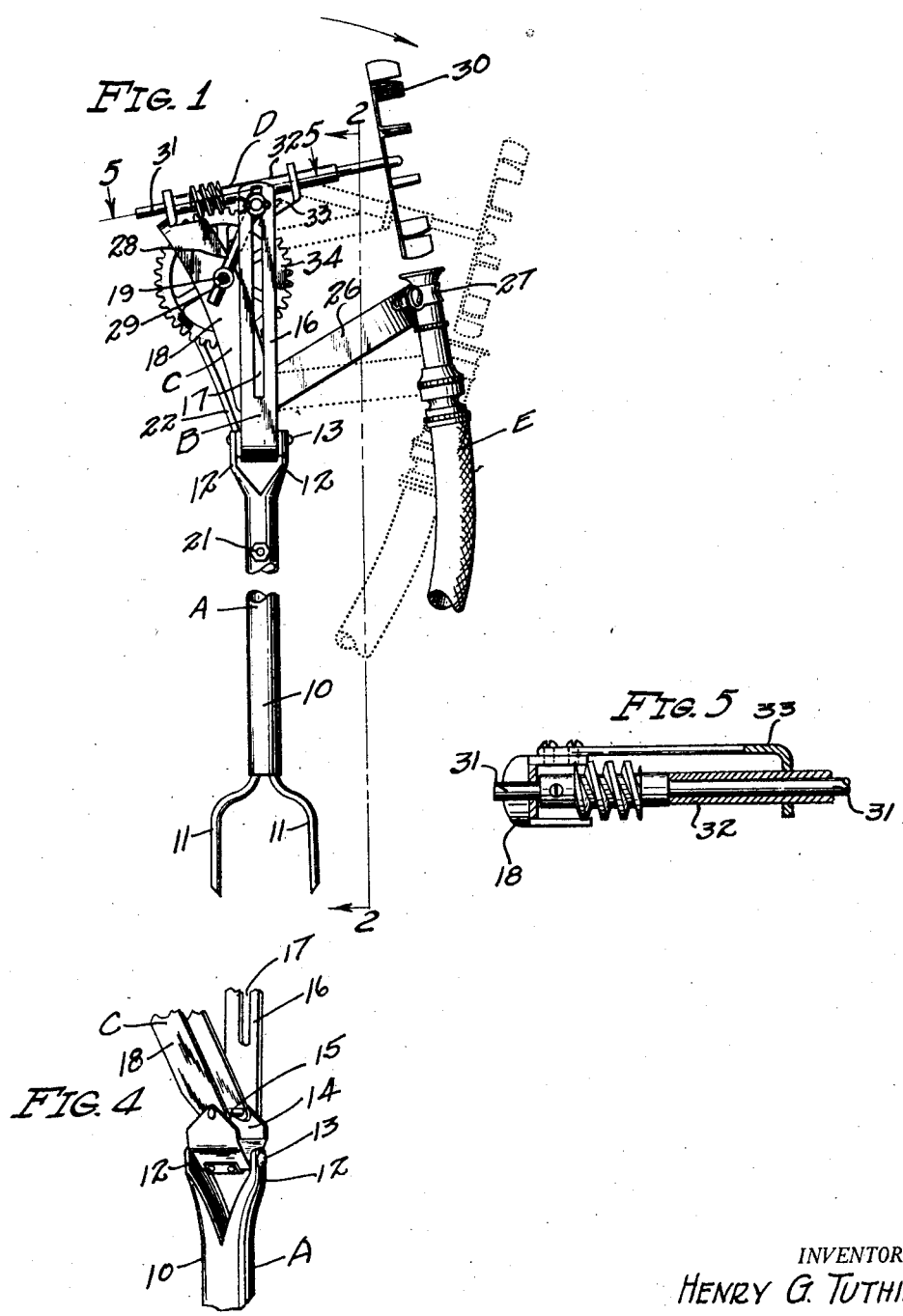

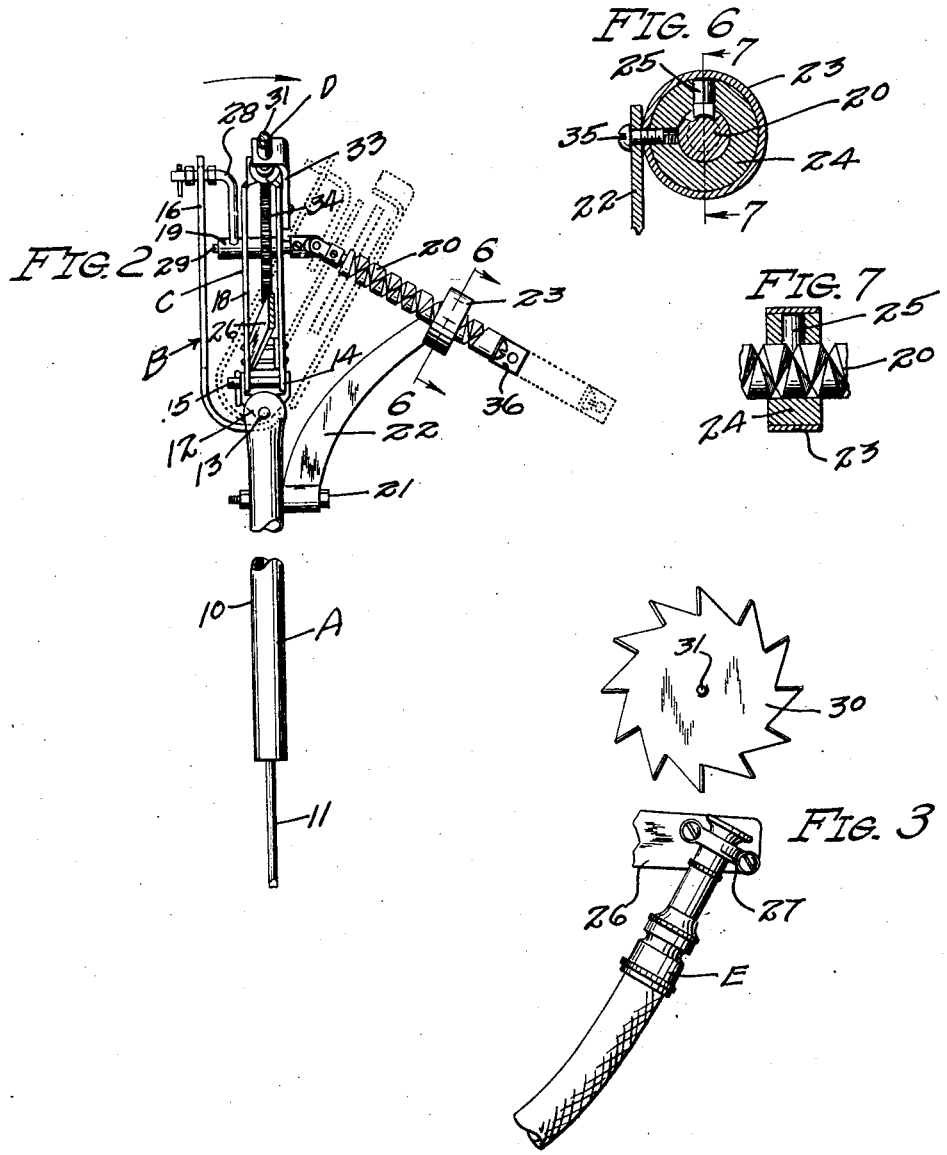

1,716,015

UNITED STATES PATENT OFFICE.

HENRY G. TUTHILL, OF LOS ANGELES, CALIFORNIA, ASSIGNOR TO E. B. HOLLIS, OF LOS ANGELES, CALIFORNIA.

AUTOMATIC LAWN SPRINKLER.

Application filed October 3, 1927. Serial No. 223,649.

This invention relates to a lawn sprinkler mechanism which will direct a sprinkler nozzle so as to distribute the water therefrom over a prescribed area of lawn or surface to be irrigated, the nozzle being moved to and fro and back and forth. It is especially suitable for covering square or rectangular areas.

The objects of this invention are first to provide a mechanism of the character described which will obviate the necessity of attention by or of control and direction by the user; second, to provide a mechanism in which the motive power is supplied directly by the stream of water; third, to provide a mechanism which may be adjusted to change the width of the area to be covered; fourth, to provide a mechanism which has a reversible screw shaft for controlling motion in one direction; and fifth to provide details of structure, whereby a simple, economical, efficient and positively operating mechanism is obtained.

These objects together with other objects and corresponding accomplishments are obtained by means of the embodiment of my invention illustrated in the accompanying drawing, in which:

Fig. 1 is a side elevation of the complete mechanism; Fig. 2 is a section as seen on the line 2—2 of Fig. 1; Fig. 3 is a fragmentary view in front elevation showing the nozzle and hose; Fig. 4 is a fragmentary perspective view showing the connection of the supporting stand, carriage and carrier; Fig. 5 is a section on an enlarged scale as seen on the line 5—5 of Fig. 1; Fig. 6 is a section as seen on the line 6—6 of Fig. 2 on an enlarged scale; and Fig. 7 is a section as seen on the line 7—7 of Fig. 6.

Referring with more particularity to the drawing, the mechanism comprises broadly a support A which may be mounted in relatively fixed position. Pivotally mounted upon the support is a carriage B. Pivotally mounted upon the carriage so as to be oscillatable at right angles thereto and forming a part thereof is a nozzle carrier C. Mounted upon the carrier is a fluid operated motor D arranged to be actuated by the stream from a nozzle mounted upon the carrier. The construction is such that the stream of water from the nozzle revolves the water wheel causing the carrier and with it the nozzle to be oscillated in one direction, while the carriage is simultaneously oscillated in a transverse direction.

The support A comprises a standard 10 having prongs 11 at the bottom adapted to be inserted in the ground so as to support the stand. The upper end of the stand is forked to provide ears 12 spanned by a pivot pin 13. Pivotally mounted upon pin 13 is a bracket 14 having ears, and a pivot pin 15 extending therebetween. Fixed to the bracket and extending upwardly therefrom is a crank guide or slide 16. The guide 16 has a slot 17 for a crank to slide therein. The carrier comprises a yoke 18 pivotally mounted upon pin 15 so as to be oscillatable transverse to the direction of oscillation of the carriage. Journalled in the yoke is a shaft 19 and connected thereto by a universal joint is a reverse double threaded shaft 20, the shaft forming a continuation of shaft 19. A pivotal shaft 21 has mounted thereon an arm 22. At the end of the arm is a sleeve 23 in which the shaft section is journalled. Mounted within the sleeve and forming a part thereof is a bushing 24 having a pin 25 mounted therein so as to be rotatable and is provided with a tooth end riding in the indentations of the threads on shaft 20. The construction is such that upon rotating the reverse thread shaft, the latter will be reciprocated axially. Extending from the yoke 18 and forming a part thereof is a nozzle arm 26 having a clamp 27 thereon to hold the nozzle E. A transverse bore in shaft 19 receives a crank 28, the length of the crank being adjustable by reason of a set screw 29. The crank arm extends through the slot 17 in slide 16. Rotation of the shaft 19 will cause the carriage to be operated slowly by reason of the screw section 20 and the carrier with the nozzle to be oscillated transverse to the travel of the carriage.

The motor means for operating the mechanism comprises a water wheel 30 mounted upon a shaft 31. The shaft 31 has fixed thereon a sleeve with a screw. The shaft is journalled in a sleeve 32 in a bracket 33 secured to the yoke and in a bearing tongue offset from the yoke. The water wheel is disposed in front of the nozzle so that the stream therefrom will impinge upon the water wheel and cause the latter to rotate. The thread on shaft 31 meshes with a gear 34, the latter being fixed to the shaft 19. Obviously, the stream of water from the nozzle will rotate the water wheel and actuate the mechanism.

Upon turning on the water, the carriage will be caused to oscillate forwardly and backwardly, while the carrier will be moved more quickly from side to side. This will cause the stream of water to be projected in a zigzag path over a square or rectangular area and thereby to be evenly distributed over any subscribed area. The width of the area covered may be adjusted by means of a crank arm 28.

Suppose it is desirable to swing the nozzle from side to side but not back and forth, that is, to have only one motion. Referring particularly to Figs. 2 and 6, it will be noted that sleeve 23 is secured to arm 22 by a screw 35. A clip 36 is swivelled to the end of shaft section 20. The screw 35 is removed from the sleeve and the arm 22 fastened by the screw and clip to the end of shaft section 20 thereby holding the carriage in fixed position and only the carrier will oscillate. This is especially useful in watering parking strips and like areas.

What I claim is:—

1. An automatic sprinkler mechanism comprising a relatively stationary support, a carriage oscillatable thereon, operating means for oscillating said carriage mounted on said support and geared to the latter including a reverse screw and nut, a nozzle carrier oscillatable on said carriage, actuating means to oscillate said carrier, said operating means and said actuating means being geared together, and a motor for driving said operating means and said actuating means.

2. An automatic sprinkler mechanism comprising a relatively stationary support, a carriage oscillatable thereon, a carrier oscillatable on said carriage transverse to the travel of the latter, a shaft journalled in said carrier, motor means to rotate the shaft, means on said shaft revolved thereby and linked to said carriage to oscillate the carrier, and means on said shaft actuated thereby to reciprocate the shaft axially and oscillate the carriage.

3. An automatic sprinkler mechanism comprising a relatively stationary support, a carriage oscillatable thereon, a carrier oscillatable on said carriage, a water nozzle on said carrier, a water wheel disposed to be driven by the stream of water issuing from said nozzle, a shaft geared to said water wheel so as to be driven thereby, means on said shaft revolved thereby and linked to said carriage to oscillate the carrier, and means on said shaft and actuated thereby to reciprocate said shaft axially and oscillate said carriage.

4. An automatic sprinkler mechanism comprising a relatively stationary support, a carriage oscillatable thereon, a nozzle carrier oscillatable on said carriage transverse to the travel of the latter, a shaft having a double reverse thread thereon, said shaft being journalled on said carrier, motor means to rotate said shaft, means on said shaft operated by rotation thereof to oscillate the carrier, and a nut on said shaft meshing with the threads on the latter and secured to said support to reciprocate said shaft axially and thereby oscillate the carriage.

5. An automatic sprinkler mechanism comprising a relatively stationary support, a carriage oscillatable thereon, a nozzle carrier oscillatable on said carriage transverse to the travel of the latter, a nozzle on said carrier, a shaft journalled and held against axial movement on said carriage having a double reverse screw thread thereon, a water wheel disposed to be driven by the stream of water issuing from said nozzle, said shaft being geared to said water wheel so as to be driven thereby, means on said shaft operated by rotation thereof to oscillate said carrier, and a nut on said shaft meshing with the threads on the latter and secured to said support to reciprocate said shaft axially and thereby oscillate the carriage.

6. An automatic sprinkler mechanism comprising a relatively stationary support, a carriage oscillatable thereon, a nozzle carrier oscillatable on said carriage transverse to the travel of the latter, a shaft journalled on said carrier, a screw on said shaft, a nut secured to said support and meshing with said screw to oscillate the carriage, a crank slide on said carriage, and a crank arm on said shaft having a crank engaged with said slide to oscillate said carrier.

7. An automatic sprinkler mechanism comprising a relatively stationary support, a carriage oscillatable thereon, a nozzle carrier oscillatable on said carriage transverse to the travel of the latter, a shaft journalled on said carrier, a crank slide on said carriage, an adjustable length crank arm on said shaft having a crank engaged with said slide to oscillate said carrier, and means on said shaft and actuated thereby to reciprocate said shaft axially and oscillate said carriage, and motor means to rotate said shaft.

8. An automatic sprinkler mechanism comprising a relatively stationary support, a carriage oscillatable thereon, a nozzle carrier oscillatable on said carriage transverse to travel of the latter, a nozzle on said carrier, a water wheel disposed to be driven by the stream of water issuing from said nozzle, a shaft geared to said water wheel so as to be driven thereby, a crank slide on said carriage, a crank arm on said shaft having a crank engaged with said slide to operate said carrier, and means on said shaft and actuated thereby to reciprocate said shaft axially and oscillate said carriage.

9. An automatic sprinkler mechanism comprising a relatively stationary support, a carriage oscillatable thereon, a nozzle carrier oscillatable on said carriage, a nozzle on said carrier, a water wheel disposed to be driven by the stream of water from said nozzle, a shaft geared to said water wheel so as to be driven thereby, an adjustable length crank arm on said shaft, a crank slide on said carriage with which the crank on said arm is engaged to oscillate said carrier, and means on said shaft and actuated thereby to reciprocate said shaft axially and oscillate said carriage.

10. An automatic sprinkler mechanism comprising a relatively stationary support, a carriage oscillatable thereon, a nozzle carrier oscillatable on said carriage transverse to the travel of said carriage, a shaft having a double reverse screw thread thereon, motor means to rotate said shaft, a crank slide on said carriage, a crank arm on said shaft having a crank engaged with said slide to oscillate said carrier, and a nut on said shaft meshing with the threads on the latter and secured to said support to reciprocate said shaft axially and thereby oscillate said carriage.

11. An automatic sprinkler mechanism comprising a relatively stationary support, a carriage oscillatable thereon, a nozzle carrier oscillatable on said carriage, a shaft having a double reverse thread thereon, motor means to rotate said shaft, an adjustable length crank arm on said shaft having a crank, a crank slide on said carriage guiding said crank so as to oscillate said carrier, and a nut on said shaft meshing with the thread on the latter and secured to said support to reciprocate said shaft axially and thereby oscillate said carriage.

12. An automatic sprinkler mechanism comprising a relatively stationary support, a carriage oscillatable thereon, a nozzle carrier oscillatable on said carriage transverse to the travel of said carriage, a shaft having a double reverse screw thread thereon, a nozzle on said carrier, a water wheel disposed to be driven by the stream of water issuing from said nozzle, said shaft being geared to said water wheel so as to be driven thereby, a crank slide on said carriage, a crank arm on said shaft having the crank engaged with said slide to oscillate said carrier, and a nut on said shaft meshing with the thread on the latter and secured to said support to reciprocate said shaft axially and thereby oscillate said carriage.

13. An automatic sprinkler mechanism comprising a relatively stationary support, a carriage oscillatable thereon, a nozzle carrier oscillatable on said carriage, a nozzle on said carrier, a water wheel disposed to be driven by the stream of water issuing from said nozzle, a shaft having a double reverse screw thread thereon, said shaft being geared to water wheel so as to be driven thereby, a crank slide on said carriage, an adjustable length crank arm on said shaft having a crank engaged with said slide to oscillate said carrier, and a nut on said shaft meshing with the threads on the latter and secured to said support to reciprocate said shaft axially and thereby oscillate said carriage.

14. An automatic sprinkler mechanism comprising a relatively stationary support, a carriage oscillatable thereon, a carrier oscillatable on said carriage, a main shaft journalled in said carrier, a crank arm on said shaft, a crank slide on said carriage with which the crank on said crank arm is engaged to oscillate said carrier, means on said shaft and coupled to said support to reciprocate said shaft upon rotation of the latter and thereby oscillate said carriage, a drive shaft, gears connecting said drive shaft and said main shaft, and motor means for rotating said drive shaft.

15. An automatic sprinkler mechanism comprising a relatively stationary support, a carriage oscillatable thereon, a carrier oscillatable on said carriage, a main shaft journalled in said carrier, an adjustable length crank arm on said main shaft, a crank slide on said carriage with which the crank on said crank arm is engaged to oscillate said carrier, means on said shaft and coupled to said support to reciprocate said shaft upon rotation of the latter and thereby oscillate said carriage, a drive shaft, gears connecting said drive shaft and said main shaft, and motor means for rotating said drive shaft.

16. An automatic sprinkler mechanism comprising a relatively stationary support, a carriage oscillatable thereon, a carrier oscillatable on said carriage, a main shaft journalled in said carrier, a crank arm on said main shaft, a crank slide on said carriage with which the crank on said crank arm is engaged to oscillate said carrier, means on said shaft and coupled to said support to reciprocate said shaft upon rotation of the latter and thereby oscillate said carriage, a drive shaft, gears connecting said drive shaft and said main shaft, and a water wheel disposed to be actuated by the stream from the nozzle for driving said main shaft.

17. An automatic sprinkler mechanism comprising a relatively stationary support, a carriage oscillatable thereon, a carrier oscillatable on said carriage, a main shaft journalled in said carrier, a crank arm on said main shaft, a crank slide on said carriage with which the crank on said crank arm is engaged to oscillate said carrier, means on said shaft and coupled to said support to reciprocate said shaft upon rotation of the latter and thereby oscillate said carriage, a gear on said shaft, a worm shaft meshing with said gear, and motor means to rotate said worm shaft.

18. An automatic sprinkler mechanism comprising a relatively stationary support, a carriage oscillatable thereon, a nozzle carrier oscillatable on said carriage, a nozzle on said carrier, a main shaft journalled in said carrier, an adjustable length crank arm on said main shaft, a crank slide on said carriage with which the crank on said crank arm is engaged to oscillate said carrier, means on said shaft and coupled to said support to reciprocate said shaft upon rotation of the latter and thereby oscillate said carriage, a gear on said main shaft, a worm shaft meshing with said gear, and a water wheel disposed to be actuated by the stream from the nozzle for driving said drive shaft.

In witness that I claim the foregoing I have hereunto subscribed my name this 24th day of September, 1927.

HENRY G. TUTHILL.